(12) United States Patent
Sawada et al.

(10) Patent No.: US 9,394,409 B2
(45) Date of Patent: Jul. 19, 2016

(54) INK JET RECORDING HEAD

(71) Applicant: CANON KABUSHIKI KAISHA, Tokyo (JP)

(72) Inventors: Etsuko Sawada, Tokyo (JP); Hiroaki Mihara, Machida (JP); Ken Ikegame, Ebina (JP); Satoshi Tsutsui, Yokohama (JP); Yohei Hamade, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/002,798

(22) Filed: Jan. 21, 2016

(65) Prior Publication Data

US 2016/0136954 A1 May 19, 2016

Related U.S. Application Data

(62) Division of application No. 14/719,908, filed on May 22, 2015, now Pat. No. 9,273,187, which is a division of application No. 14/383,223, filed as application No. PCT/JP2013/061960 on Apr. 17, 2013, now Pat. No. 9,150,697.

(30) Foreign Application Priority Data

Apr. 18, 2012 (JP) .................................. 2012-094782
Mar. 4, 2013 (JP) .................................. 2013-041650

(51) Int. Cl.
*B41J 2/135* (2006.01)
*C08G 77/24* (2006.01)
*B41J 2/16* (2006.01)
*B41J 2/14* (2006.01)

(52) U.S. Cl.
CPC .............. *C08G 77/24* (2013.01); *B41J 2/1433* (2013.01); *B41J 2/162* (2013.01); *B41J 2/1603* (2013.01); *B41J 2/1606* (2013.01); *B41J 2/1631* (2013.01); *B41J 2/1639* (2013.01); *B41J 2/1645* (2013.01)

(58) Field of Classification Search
CPC ........ B41J 2/1433; B41J 2/1606; B41J 2/162; B41J 2/1603; B41J 2/1631; B41J 2/1645; B41J 2/1639
See application file for complete search history.

(56) References Cited

U.S. PATENT DOCUMENTS 5,644,014 A 7/1997 Schmidt et al.
6,283,578 B1 9/2001 Popall et al.
(Continued)

FOREIGN PATENT DOCUMENTS

CN 1771132 A 5/2006
CN 102001225 A 4/2011
(Continued)

OTHER PUBLICATIONS

First Office Action in Chinese Application No. 201380020544.8 (dated Jun. 2, 2015).

(Continued)

*Primary Examiner* — Stephen Meier
*Assistant Examiner* — Patrick King
(74) *Attorney, Agent, or Firm* — Fitzpatrick, Cella, Harper & Scinto

(57) ABSTRACT

Provided is an ink jet recording head, including a member provided with an ejection orifice for ejecting ink, in which the ink jet recording head further includes a water-repellent layer including a cured product of a condensed product obtained by condensation of a hydrolyzable silane compound having an epoxy group and a hydrolyzable silane compound having a perfluoropolyether group on a surface of the member on a side on which the ejection orifice opens.

9 Claims, 2 Drawing Sheets

(56) References Cited

U.S. PATENT DOCUMENTS

| | | | |
|---|---|---|---|
| 7,758,158 B2 * | 7/2010 | Ohkuma | B41J 2/1603 |
| | | | 347/45 |
| 8,191,992 B2 | 6/2012 | Lin et al. | |
| 8,251,491 B2 | 8/2012 | Ohkuma et al. | |
| 9,050,806 B2 | 6/2015 | Sawada | |
| 9,150,697 B2 | 10/2015 | Sawada et al. | |
| 2003/0030696 A1 | 2/2003 | Sato et al. | |
| 2003/0206214 A1 | 11/2003 | Soga et al. | |
| 2007/0085877 A1 | 4/2007 | Ohkuma et al. | |
| 2013/0216958 A1 | 8/2013 | Tsutsui et al. | |
| 2014/0272725 A1 | 9/2014 | Hamade et al. | |
| 2014/0309329 A1 | 10/2014 | Sawada et al. | |
| 2014/0311661 A1 | 10/2014 | Tsutsui et al. | |
| 2015/0077470 A1 | 3/2015 | Sawada et al. | |
| 2015/0116427 A1 | 4/2015 | Tsutsui et al. | |
| 2015/0251419 A1 | 9/2015 | Sawada et al. | |

FOREIGN PATENT DOCUMENTS

| | | | |
|---|---|---|---|
| EP | 0 587 667 B1 | | 9/1995 |
| EP | 0 816 094 A1 | | 1/1998 |
| EP | 0 778 869 B1 | | 1/2001 |
| JP | 6-171094 A | | 6/1994 |
| JP | 6-210857 A | | 8/1994 |
| JP | 2000-117902 A | | 4/2000 |
| JP | 2001-246756 A | | 9/2001 |
| JP | 2007-518587 A | | 7/2007 |
| JP | 2008-213201 A | | 9/2008 |
| JP | 2008-214566 A | | 9/2008 |
| JP | 2009-214338 A | | 9/2009 |
| KR | 10-2006-0036465 A | | 4/2006 |
| KR | 20060036465 A | * | 4/2006 |
| KR | 10-2010-069593 A | | 6/2010 |
| WO | 2005/007413 A1 | | 1/2005 |

OTHER PUBLICATIONS

International Search Report and Written Opinion in International Application No. PCT/JP2013/061960 (mailed Jul. 10, 2013).

International Preliminary Report on Patentability in International Application No. PCT/JP2013/061960 (mailed Oct. 30, 2014).

Notice of Preliminary Rejection in Korean Application No. 10-2014-7031498 (mailed Mar. 22, 2016).

* cited by examiner

INK JET RECORDING HEAD

CROSS-REFERENCE TO RELATED APPLICATIONS

This application is a divisional application of application Ser. No. 14/719,908, filed May 22, 2015, which is a divisional application of application Ser. No. 14/383,223, which was the National Stage of International Application No. PCT/JP2013/061960, filed Apr. 17, 2013, now U.S. Pat. No. 9,150,697, which claims the benefit of Japanese Patent Application No. 2012-094782, filed Apr. 18, 2012, and Japanese Patent Application No. 2013-041650, filed Mar. 4, 2013. All of these prior applications are incorporated herein by reference in their entirety.

TECHNICAL FIELD

The present invention relates to an ink jet recording head and a manufacturing method therefor.

BACKGROUND ART

Characteristics of an ejection orifice surface of an ink jet recording head are important for providing satisfactory ejection performance. When an ink well remains in the vicinity of an ejection orifice, a flying direction of an ink droplet is deflected and an ejection rate of the ink droplet lowers in some cases. Therefore, as a method of ejecting ink with good precision, there is given a method involving subjecting the vicinity of an ejection orifice portion to water-repellent treatment. In general, a silicon-containing compound, a fluorine compound, or the like is used as a material for forming a water-repellent surface. The fluorine compound is suitable for ejecting inks containing various solvents and colorants like the ink jet recording head. As the fluorine compound exhibiting satisfactory water repellency, for example, there are known a perfluoroalkyl-group-containing compound and a perfluoropolyether-group-containing compound. Of those, a perfluoropolyether-group-containing compound has attracted attention from the viewpoint of environmental suitability in recent years.

Further, in order to maintain a condition of an ejection orifice portion surface of the ink jet recording head, ink remaining on the surface is regularly wiped with a rubber blade or the like in some cases. Therefore, the ejection orifice portion surface after the water-repellent treatment is required to have high durability against abrasion. Patent Literature 1 discloses an example using a compound having a perfluoropolyether group and an alkoxysilyl group as a water-repellent treatment method by which a water-repellent film having high durability is provided.

CITATION LIST

Patent Literature

PTL 1: Japanese Patent Application Laid-Open No. 2009-214338

SUMMARY OF INVENTION

Technical Problem

An ink jet recording head according to the present invention is an ink jet recording head, including a member provided with an ejection orifice for ejecting ink, in which the ink jet recording head further includes a water-repellent layer including a cured product of a condensed product obtained by condensation of a hydrolyzable silane compound having an epoxy group and a hydrolyzable silane compound having a perfluoropolyether group on a surface of the member on a side on which the ejection orifice opens.

A manufacturing method for an ink jet recording head according to the present invention is a manufacturing method for an ink jet recording head including a substrate, a member provided with an ejection orifice for ejecting ink, and a water-repellent layer provided on a surface of the member on a side on which the ejection orifice opens, the manufacturing method including the steps of:

(1) forming a cationically photopolymerizable resin layer including a cationically photopolymerizable resin material having an epoxy group on a substrate;

(2) forming a layer including a condensed product obtained by condensation of a hydrolyzable silane compound having an epoxy group and a hydrolyzable silane compound having a perfluoropolyether group on the cationically photopolymerizable resin layer before curing;

(3) pattern-exposing the cationically photopolymerizable resin layer and the layer including the condensed product concurrently;

(4) subjecting exposed portions of the cationically photopolymerizable resin layer and the layer including the condensed product to simultaneous curing; and (5) removing non-exposed portions of the cationically photopolymerizable resin layer and the layer including the condensed product to form an ejection orifice, thereby providing a member and a water-repellent layer.

Further features of the present invention will become apparent from the following description of exemplary embodiments with reference to the attached drawings.

DESCRIPTION OF EMBODIMENTS

Figure 1:
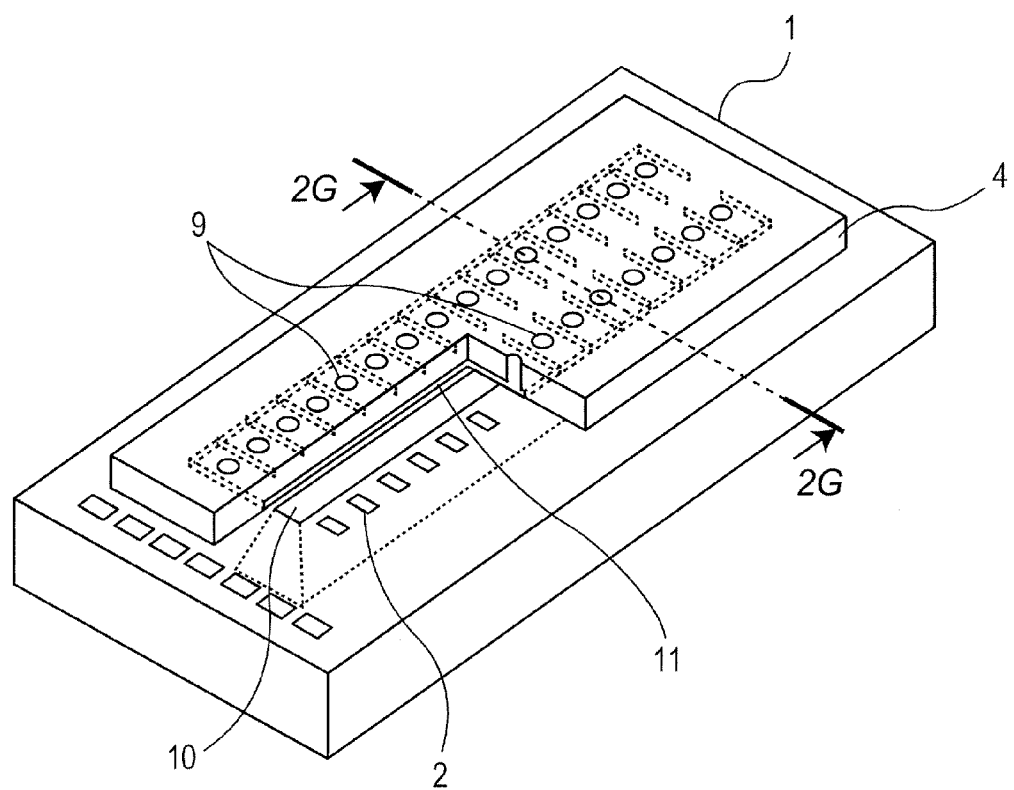
FIG. 1 is a perspective view illustrating an ink jet recording head according to an embodiment of the present invention.

Hereinafter, the present invention will be described in detail using suitable embodiments.

In recent years, a manufacturing method for an ink jet recording head involving using a photosensitive resin has been employed in order to form a high-precision, high-definition ejection orifice portion. However, the method disclosed in Patent Literature 1, which requires a $SiO_2$ film as an inorganic film for increasing adhesive strength between a water-repellent material and a surface to be subjected to water-repellent treatment, is not applicable to the method involving using a photosensitive resin. Further, the perfluoropolyether-group-containing compound disclosed in Patent Literature 1 is soluble in a fluorine-containing solvent only, and hence it is difficult to introduce a photosensitive group having high polarity such as an acrylate or an epoxy compound. Therefore, when an ink jet recording head is manufactured through use of a photosensitive resin, it is difficult to apply the method disclosed in Patent Literature 1. Further, there is a demand for additional improvements in water repellency and durability against abrasion.

An object of the present invention is to provide an ink jet recording head having high water repellency and high durability against abrasion.

An ink jet recording head according to the present invention is an ink jet recording head, including a member provided with an ejection orifice for ejecting ink, in which the ink jet recording head further includes a water-repellent layer including a cured product of a condensed product obtained by condensation of a hydrolyzable silane compound having an epoxy group and a hydrolyzable silane compound having a perfluoropolyether group on a surface of the member on a side on which the ejection orifice opens.

According to the present invention, the hydrolyzable silane compound having an epoxy group can be chemically bonded to the hydrolyzable silane compound having a perfluoropolyether group. Hence, a water-repellent material having high adhesion property with a cationically photopolymerizable resin layer as an undercoat layer is obtained. The water-repellent material is laminated on the cationically photopolymerizable resin layer to be a member, and the material and layer are concurrently patterned to form an ejection orifice. Thus, an ink jet recording head having high water repellency and high durability against abrasion and including a high-precision ejection orifice can be obtained.

Embodiments of the present invention are hereinafter described in detail with reference to the drawings. It should be noted that, in the following descriptions, constituent elements having the same function are denoted by the same number in the drawings, and descriptions thereof are omitted in some cases.

FIG. 1 is a schematic perspective view illustrating an ink jet recording head according to an embodiment of the present invention. The ink jet recording head illustrated in FIG. 1 includes a substrate 1 provided with multiple energy generating elements 2. The substrate 1 is provided with a member 4, which forms an ink flow path 11 for holding ink and is provided with ejection orifices 9 for ejecting ink communicated with the ink flow path 11. A water-repellent layer (not shown) is provided on the surface of the member 4 on the side on which the ejection orifices 9 are formed. In the present invention, the water-repellent layer includes a cured product of a condensed product obtained by condensation of a hydrolyzable silane compound having an epoxy group and a hydrolyzable silane compound having a perfluoropolyether group. It is preferred that the water-repellent layer further include a cured product obtained by subjecting the condensed product obtained by condensation of a hydrolyzable silane compound having an epoxy group and a hydrolyzable silane compound having a perfluoropolyether group to a curing reaction with an epoxy resin. In this case, the epoxy resin is contained in the member 4 and is present on the surface on which the member 4 comes into contact with the water-repellent layer, or the epoxy resin is mixed into the condensed product in forming the water-repellent layer.

An ink supply port 10 for supplying ink into the ink flow path 11 is provided in the back surface of the substrate 1.

A manufacturing method for an ink jet recording head according to the present invention is a manufacturing method for an ink jet recording head including a substrate, a member provided with an ejection orifice for ejecting ink, and a water-repellent layer provided on a surface of the member on a side on which the ejection orifice opens, the manufacturing method including the steps of:

(1) forming a cationically photopolymerizable resin layer including a cationically photopolymerizable resin material having an epoxy group on a substrate;

(2) forming a layer including a condensed product obtained by condensation of a hydrolyzable silane compound having an epoxy group and a hydrolyzable silane compound having a perfluoropolyether group on the cationically photopolymerizable resin layer before curing;

(3) pattern-exposing the cationically photopolymerizable resin layer and the layer including the condensed product concurrently;

(4) subjecting exposed portions of the cationically photopolymerizable resin layer and the layer including the condensed product to simultaneous curing; and (5) removing non-exposed portions of the cationically photopolymerizable resin layer and the layer including the condensed product to form an ejection orifice, thereby providing a member and a water-repellent layer.

FIGS. 2A to 2G are cross-sectional views illustrating cross-sections taken along the line 2G-2G of the ink jet recording head illustrated in FIG. 1 for the respective manufacturing steps. A manufacturing method for an ink jet recording head according to an embodiment of the present invention is hereinafter described with reference to FIGS. 2A to 2G. However, the present invention is not limited thereto.

Figure 2A:
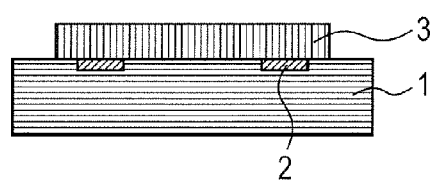
FIGS. 2A, 2B, 2C, 2D, 2E 2F and 2G are cross-sectional views illustrating a manufacturing method for an ink jet recording head according to the present invention.

First, a positive photosensitive resin layer is formed on the substrate 1 having the energy generating elements 2 formed thereon. The positive photosensitive resin layer is patterned to form an ink flow path pattern 3 (FIG. 2A).

A silicon substrate, a glass substrate, a resin substrate, or the like may be used as the substrate 1. The energy generating elements 2 are not particularly limited as long as the elements can impart ejection energy for ejecting ink to ink and eject the ink from ejection orifices. For example, a heat generating resistor element, a piezoelectric element, or the like may be used. It should be noted that the energy generating elements 2 may be connected to a control signal input electrode (not shown) for driving the elements. Further, the substrate 1 may be further provided with various functional layers such as a protective layer (not shown) for the purpose of improving the durability of the energy generating elements 2 or an adhesiveness improving layer (not shown) for the purpose of improving adhesiveness between a cationically photopolymerizable resin material to be described later and the substrate 1.

A positive photosensitive resin material contained in the positive photosensitive resin layer is not particularly limited, and a material having resistance to the step of patterning a cationically photopolymerizable resin layer 4 to be described later may be used. That is, it is desired that the material have such resistance that a pattern does not undergo deformation by a solvent to be used in applying a cationically photopolymerizable resin material constituting the cationically photopolymerizable resin layer 4. Therefore, the positive photosensitive resin material is preferably a polymeric photodegradable positive resist. Examples of the polymeric photodegradable positive resist include polymethyl isopropenyl ketone, polymethyl methacrylate, and polymethyl glutarimide. Further, the positive photosensitive resin material causes a pattern failure through its photosensitization at the time of the exposure of the cationically photopolymerizable resin layer 4 in some cases, and hence is preferably a material having a low absorbance to the exposure wavelength of the cationically photopolymerizable resin material. Examples of the material include polymethyl isopropenyl ketone. One kind of those positive photosensitive resin materials may be used alone, or two or more kinds thereof may be used in combination. It is also useful to add a light absorbing material in order to prevent pattern deformation caused by reflected light from the substrate.

In addition, multiple layers may be laminated depending on a required thickness or shape.

As a method of forming the positive photosensitive resin layer, for example, there is given the following method. The positive photosensitive resin material is appropriately dissolved in a solvent, and the solution is applied by a spin coating method. After that, the solvent is evaporated by baking. Thus, the positive photosensitive resin layer can be formed.

The thickness of the positive photosensitive resin layer is equal to the height of the ink flow path, and hence is appropriately determined depending on the design of the ink jet recording head. The thickness of the positive photosensitive resin layer may be set to, for example, 5 to 30 µm.

As a method of patterning the positive photosensitive resin layer, for example, there is given the following method. The positive photosensitive resin layer is pattern-exposed by irradiation with an active energy ray capable of photosensitizing the positive photosensitive resin material, as necessary, via a mask. After that, development is performed through use of, for example, a solvent capable of dissolving the exposed portion of the positive photosensitive resin layer. Thus, the ink flow path pattern 3 can be formed.

Figure 2D:
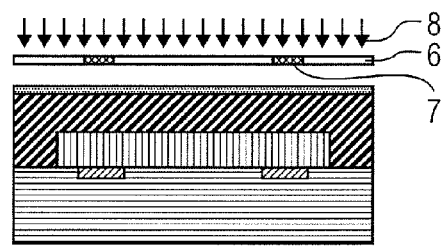
Figure 2B:
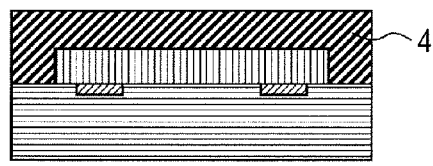

Next, the cationically photopolymerizable resin layer 4 including a cationically photopolymerizable resin material is formed on the ink flow path pattern 3 and the substrate 1 (FIG. 2B).

The cationically photopolymerizable resin material is not particularly limited and examples thereof include cationically photopolymerizable resin materials containing an epoxy compound, a vinyl ether compound, and an oxetane compound. However, the cationically photopolymerizable resin material is preferably a cationically photopolymerizable resin material containing an epoxy resin from the viewpoint of providing high mechanical strength and high adhesiveness with an undercoat layer. Examples of the cationically photopolymerizable resin material containing an epoxy resin include a bisphenol A-type epoxy resin and a novolac-type epoxy resin. As commercially available products of the epoxy resin, there are given, for example: "CELLOXIDE 2021," "GT-300 series," "GT-400 series," and "EHPE3150" (trade names) manufactured by Daicel Corporation; "157S70" (trade name) manufactured by Mitsubishi Chemical Corporation; "Epiclon N-865" (trade name) manufactured by DIC Corporation; and "SU8" manufactured by NIPPON KAYAKU Co., Ltd. One kind of those materials may be used alone, or two or more kinds thereof may be used in combination. The epoxy equivalent of the epoxy resin is preferably 2,000 or less, more preferably 1,000 or less. When the epoxy equivalent is 2,000 or less, a sufficient crosslinking density is obtained in a curing reaction, the glass transition temperature of a cured product does not lower, and high adhesiveness is obtained. The epoxy equivalent of the epoxy resin is preferably 50 or more. It should be noted that the epoxy equivalent is a value measured according to JIS K-7236. Further, when the fluidity of a coating film is high, resolution property lowers in some cases. Hence, the cationically photopolymerizable resin material is preferably a material in a solid form at 35° C. or less.

Further, the cationically photopolymerizable resin material may contain a photopolymerization initiator. As the photopolymerization initiator, for example, generally known ionic onium salts such as a sulfonium salt and an iodonium salt, and sulfonic acid compounds may be used. As commercially available products of the photopolymerization initiator, there are given, for example: "ADEKA OPTOMER SP-170," "ADEKA OPTOMER SP-172," and "SP-150" (trade names) manufactured by ADEKA CORPORATION; "BBI-103" and "BBI-102" (trade names) manufactured by Midori Kagaku Co., Ltd.; and "IBPF," "IBCF," "TS-01," and "TS-91" (trade names) manufactured by SANWA CHEMICAL CO., LTD. One kind of those photopolymerization initiators may be used alone, or two or more kinds thereof may be used in combination.

In addition, the above-mentioned epoxy resin composition may contain, for example, a basic substance such as an amine, a photosensitizing substance such as an anthracene derivative, and a silane coupling agent for the purpose of improving, for example, photolithography performance and adhesion performance.

Further, as the cationically photopolymerizable resin material, commercially available negative resists such as "SU-8 series" and "KMPR-1000" (trade names) manufactured by Kayaku MicroChem CO., LTD. and "TMMR 52000" and "TMMF 52000" (trade names) manufactured by TOKYO OHKA KOGYO CO., LTD may be used.

As a method of forming the cationically photopolymerizable resin layer 4, for example, there is given the following method. The cationically photopolymerizable resin material is appropriately dissolved in a solvent, and the solution is applied onto the ink flow path pattern 3 and the substrate 1 by a spin coating method. Thus, the cationically photopolymerizable resin layer can be formed. In the case of using a solvent, a solvent which hardly dissolves the ink flow path pattern 3 may be selected and used.

The thickness of the cationically photopolymerizable resin layer 4 on the ink flow path pattern 3 is not particularly limited and may be set to, for example, 5 to 100 µm.

Figure 2E:
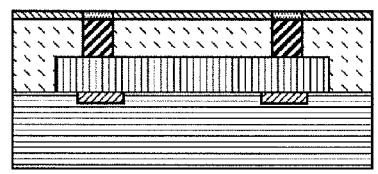
Figure 2C:
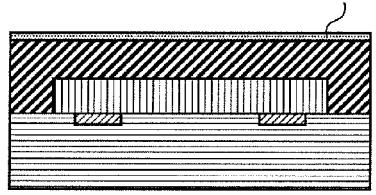

Next, a layer 5 including a condensed product obtained by condensation of a hydrolyzable silane compound having an epoxy group and a hydrolyzable silane compound having a perfluoropolyether group is formed on the cationically photopolymerizable resin layer 4 before curing (FIG. 2C). The layer 5 including the condensed product obtained by condensation of a hydrolyzable silane compound having an epoxy group and a hydrolyzable silane compound having a perfluoropolyether group is hereinafter referred to as the layer 5 including the condensed product.

When the condensed product is applied as a solution onto the cationically photopolymerizable resin layer 4 before curing, a perfluoropolyether group, which has low surface free energy, is oriented in a large amount in the outermost layer on the air interface side. On the other hand, in a portion other than the outermost layer, the amounts of an epoxy group and a siloxane component, which are components other than the perfluoropolyether group, increase depending on the amount of the perfluoropolyether group oriented in the outermost layer, and the crosslinking of the epoxy group and the dehydration condensation of a silanol group proceed owing to an acid generated from a photoinitiator and heat. This curing reaction between the epoxy group and the siloxane component allows the layer 5 including the condensed product to exhibit high durability.

In addition, when the layer 5 including the condensed product is formed on the cationically photopolymerizable resin layer 4 before curing, an epoxy group present on the side of the cationically photopolymerizable resin layer 4 in the layer 5 including the condensed product can react with an epoxy group in the cationically photopolymerizable resin layer 4 to form a bond between the cationically photopolymerizable resin layer 4 and the layer 5 including the condensed product. Further, in some kinds of applied solvents and resins, the cationically photopolymerizable resin layer 4 and the layer 5 including the condensed product dissolve into each other at their interface, and thus a bond at the interface can be made stronger. With this, high water repellency and high durability against abrasion can be imparted.

Next, the condensed product obtained by condensation of a hydrolyzable silane compound having an epoxy group and a hydrolyzable silane compound having a perfluoropolyether group is described. The hydrolyzable silane compound having an epoxy group is not particularly limited but is preferably a compound represented by the following formula (1).

  Formula (1)

In the formula (1), $R_C$ represents a non-hydrolyzable substituent having an epoxy group, R represents a non-hydrolyzable substituent, X represents a hydrolyzable substituent, and b represents an integer of 0 to 2. b represents preferably 0 or 1, more preferably 0.

In the formula (1), $R_C$ represents an organic group having one or more epoxy groups. Specific examples of the organic group $R_C$ include a glycidoxypropyl group and an epoxycyclohexylethyl group. Examples of the non-hydrolyzable substituent R include an alkyl group such as a methyl group or an ethyl group, and a phenyl group. Examples of the hydrolyzable substituent X include a halogen atom, an alkoxy group, an amino group, and a hydrogen atom. Of those, an alkoxy group such as a methoxy group, an ethoxy group, or a propoxy group is preferred from the viewpoint that a leaving group after a hydrolysis reaction does not inhibit a cationic polymerization reaction and the reactivity is easily controlled. Further, one in which part of a hydrolyzable group is hydrolyzed to a hydroxy group or forms a siloxane bond may be used. Specific examples of the hydrolyzable silane compound having an epoxy group represented by the formula (1) in which the hydrolyzable substituent having an alkoxy group as X include glycidoxypropyltrimethoxysilane, glycidoxypropyltriethoxysilane, epoxycyclohexylethyltrimethoxysilane, epoxycyclohexylethyltriethoxysilane, glycidoxypropylmethyldimethoxysilane, glycidoxypropylmethyldiethoxysilane, glycidoxypropyldimethylmethoxysilane, and glycidoxypropyldimethylethoxysilane. One kind of those hydrolyzable silane compounds having an epoxy group may be used alone, or two or more kinds thereof may be used in combination.

The hydrolyzable silane compound having a perfluoropolyether group is not particularly limited but is preferably at least one kind selected from the group consisting of compounds represented by the following formulae (2), (3), (4), and (5).

  Formula (2)

  Formula (3)

  Formula (4)

  Formula (5)

In the formulae (2), (3), (4), and (5), $R_p$ represents a perfluoropolyether group, 'A' represents an organic group having 1 to 12 carbon atoms, X represents a hydrolyzable substituent, Y represents a non-hydrolyzable substituent, Z represents a hydrogen atom or an alkyl group, R represents a non-hydrolyzable substituent, Q represents a divalent or trivalent bonding group, provided that when Q represents a divalent bonding group, n=1 and that when Q represents a trivalent bonding group, n=2, 'a' represents an integer of 1 to 3, and m represents an integer of 1 to 4.

Examples of the hydrolyzable substituent X in the formulae (2), (3), (4), and (5) include a halogen atom, an alkoxy group, an amino group, and a hydrogen atom. Of those, an alkoxy group such as a methoxy group, an ethoxy group, or a propoxy group is preferred from the viewpoint that a leaving group after a hydrolysis reaction does not inhibit a cationic polymerization reaction and the reactivity is easily controlled. Examples of the non-hydrolyzable substituent Y include a methyl group, an ethyl group, a propyl group, and a phenyl group. Examples of the alkyl group Z include a methyl group, an ethyl group, and a propyl group. Examples of the non-hydrolyzable substituent R include an alkyl group having 1 to 20 carbon atoms and a phenyl group. Examples of the bonding group Q include a carbon atom and a nitrogen atom. Examples of the organic group A having 1 to 12 carbon atoms include alkyl groups such as a methyl group, an ethyl group, and a propyl group. Further, an alkyl group having a substituent may be used.

In the formulae (2), (3), (4), and (5), it is preferred that the number of repeating units in the perfluoropolyether group $R_p$ be an integer of 1 to 30. It should be noted that the number of repeating units in the perfluoropolyether group $R_p$ refers to the number of repeating units contained in the perfluoropolyether group $R_p$. The perfluoropolyether group $R_p$ is preferably a group represented by the following formula (6).

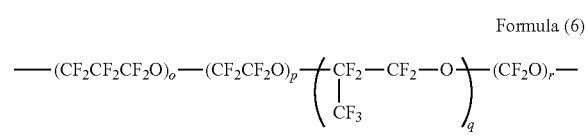

Formula (6)

In the formula (6), o, p, q, and r each represent an integer of 0 or 1 or more, and at least one of o, p, q, and r represents an integer of 1 or more. o, p, q, or r preferably represents an integer of 1 to 30. o, p, q, or r in the formula (6) corresponds to the number of repeating units described above.

The average molecular weight of the perfluoropolyether group $R_p$ in the formulae (2), (3), (4), and (5) is preferably 500 to 5,000, more preferably 500 to 2,000. When the average molecular weight of the perfluoropolyether group $R_p$ is 500 or more, sufficient water repellency is obtained. Further, when the average molecular weight of the perfluoropolyether group $R_p$ is 5,000 or less, sufficient solubility in a solvent is obtained. It should be noted that the perfluoropolyether group is a mixture of different numbers of repeating units (e.g., o, p, q, or r in the formula (6)) by its nature. In this context, the average molecular weight of the perfluoropolyether group refers to an average of the total molecular weights of moieties represented by the repeating units of the formula (6).

Preferred specific examples of the silane compound having a perfluoropolyether group include compounds represented by the following formulae (7), (8), (9), (10), and (11).

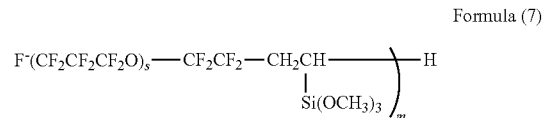

Formula (7)

(In the formula (7), s represents an integer of 1 to 30, and m represents an integer of 1 to 4.)

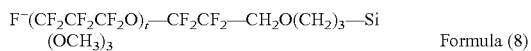

Formula (8)

(In the formula (8), t represents an integer of 1 to 30.)

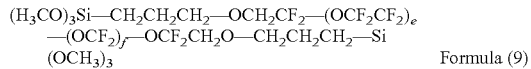

Formula (9)

(In the formula (9), e and f represent an integer of 1 to 30.)

Formula (10)

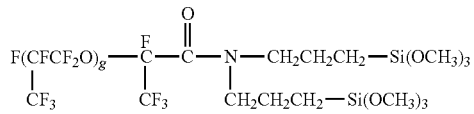

(In the formula (10), g represents an integer of 1 to 30.)

Formula (11)

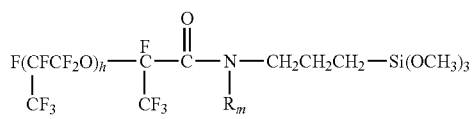

(In the formula (11), $R_m$ represents a methyl group or a hydrogen atom, and h represents an integer of 1 to 30.)

In the formula (7) to the formula (11), s, t, e, f, g, or h, the number of repeating units, preferably represents 3 to 20. When the number is less than 3, water repellency tends to lower. When the number is more than 20, solubility in a solvent lowers. It is particularly preferred that the number be 3 to 10 in the case of performing a condensation reaction in a no-fluorine-containing general-purpose solvent such as an alcohol.

As commercially available products of the silane compound having a perfluoropolyether group, there are given, for example: "OPTOOL DSX" and "OPTOOL AES" manufactured by DAIKIN INDUSTRIES, Ltd.; "KY-108" and "KY-164" manufactured by Shin-Etsu Chemical Co., Ltd.; "Novec 1720" manufactured by Sumitomo 3M Limited; and "Fluorolink S10" manufactured by SOLVAY SPECIALTY POLYMERS JAPAN K.K.

The condensed product is preferably a condensed product obtained by condensation of the hydrolyzable silane compound having an epoxy group, the hydrolyzable silane compound having a perfluoropolyether group, and a hydrolyzable silane compound represented by the following formula (12).

$(R_d)_a$—$SiX_{(4-a)}$         Formula (12)

In the formula (12), $R_d$ represents an alkyl group or an aromatic group, X represents the same hydrolyzable substituent as in the formula (1), a represents an integer of 1 to 3. Examples of the alkyl group or aromatic group $R_d$ include a methyl group, an ethyl group, a propyl group, a butyl group, a hexyl group, and a phenyl group. Specific examples of the hydrolyzable silane compound represented by the formula (12) include methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, dimethyldimethoxysilane, dimethyldiethoxysilane, phenyltrimethoxysilane, and phenyltriethoxysilane. One kind of those hydrolyzable silane compounds represented by the formula (12) may be used alone, or two or more kinds thereof may be used in combination.

By virtue of the presence of the hydrolyzable silane compound represented by the formula (12), the polarity and crosslinking density of the condensed product can be controlled. Further, the degree of freedom of a substituent in the condensed product is improved by introducing a non-reactive group $R_d$. Therefore, the orientation of the perfluoropolyether group to the side of the air interface and the orientation of the epoxy group to the side of the cationically photopolymerizable resin layer 4 are promoted. Further, by virtue of the presence of the alkyl group, the cleavage of a siloxane bond is suppressed, resulting in improvements in water repellency and durability.

In the condensed product, it is useful to further use a hydrolyzable silane compound having a fluorine-containing group different from the perfluoropolyether group in combination with the above-mentioned compounds. When the perfluoropolyether group is present in a resin solution or on a resin coating film, the aggregation of perfluoropolyether group moieties occurs and impairs the homogeneity of the material in some cases. However, by virtue of the presence of the fluorine-containing hydrolyzable silane compound, the aggregation of the perfluoropolyether group is prevented. Thus, a homogeneous coating film can be stably obtained. A general formula thereof is represented by the following formula (13).

$(R_f)_a$—$Si(R)_bX_{(4-a-b)}$         Formula (13)

In the formula (13), $R_f$ represents an alkyl group or aryl group having a fluorine atom, X represents a hydrolyzable substituent, R represents a non-hydrolyzable substituent, 'a' represents an integer of 1 or 2, b represents an integer of 0 to 2, and a+b represents an integer of 1 to 3.

In this case, the alkyl group or aryl group having a fluorine atom is preferably one having 1 to 10 fluorine atoms, particularly preferably one having 3 to 5 fluorine atoms. The incorporation of the fluorine atom prevents the separation of the perfluoropolyether group from the other components, and prevents the aggregation of the perfluoropolyether group. On the other hand, a compound having a large number of fluorine atoms and exhibiting water repellency and oil repellency may aggregate by itself, with the result that an effect of preventing the aggregation of the perfluoropolyether group lowers.

Specific examples of the alkyl group or aryl group having a fluorine atom include a methyl group, an ethyl group, a n-propyl group, an isopropyl group, a n-butyl group, a sec-butyl group, an isobutyl group, a tert-butyl group, a phenyl group, and a naphthyl group in which part or all of hydrogen atoms thereof are substituted by a fluorine atom. For example, hydrolyzable silane compounds having a 3,3,3-trifluoropropyl group, a pentafluorophenyl group, and a perfluorobutyl group are easily available as commercially available reagents. One kind of those hydrolyzable silane compounds represented by the formula (13) may be used alone, or two or more kinds thereof may be used in combination. The blending ratio of the hydrolyzable silane compound in the preparation of the condensed product according to the present invention is appropriately determined depending on usage patterns. However, the blending ratio of the hydrolyzable silane compound having a perfluoropolyether group is 0.01 to 5 mol %, when calculated with respect to 100 mol % of the total number of moles of the hydrolyzable silane compounds to be used. The blending ratio is more preferably 0.05 to 3 mol %. When the blending ratio is 0.01 mol % or less, sufficient water repellency is not obtained in some cases. Further, when the blending ratio is 5 mol % or more, the aggregation and precipitation of the hydrolyzable silane compound having a perfluoropolyether group occur, with the result that a homogeneous coating solution or coating film is not obtained in some cases.

Further, it is preferred that the blending amount of the hydrolyzable silane compound having an epoxy group be also controlled from the viewpoint of providing adhesion property with the cationically photopolymerizable resin layer 4 as an undercoat layer and the durability of the water-repellent layer. The blending amount of the hydrolyzable silane compound having an epoxy group is preferably 10 to 90 mol %, more preferably 30 to 70 mol %, when calculated with respect to 100 mol % of the total number of moles of the hydrolyzable silane compounds to be used. When the blending ratio is 10 mol % or less, sufficient coating film durability is not obtained. When the blending ratio is 90 mol % or more, a reduction in water repellency due to the polarity of the epoxy group occurs in some cases.

In the case of using the hydrolyzable silane compound represented by the formula (12), the blending amount of the hydrolyzable silane compound represented by the formula (12) is preferably 5 to 70 mol %, more preferably 10 to 50 mol %, when calculated with respect to 100 mol % of the total number of moles of the hydrolyzable silane compounds to be used.

Further, in the case of using the hydrolyzable silane compound represented by the formula (13), the blending amount of the hydrolyzable silane compound represented by the formula (13) is preferably 5 to 70 mol %, more preferably 10 to 50 mol %, when calculated with respect to 100 mol % of the total number of moles of the hydrolyzable silane compounds to be used.

It should be noted that the hydrolyzable silane compound having a fluorine-containing group different from the perfluoropolyether group prevents the aggregation of the perfluoropolyether group, and hence the proportion of the compound to the hydrolyzable silane compound having a perfluoropolyether group is important. The molar proportion of the hydrolyzable silane compound having a fluorine-containing group different from the perfluoropolyether group is preferably 2-fold to 100-fold, more preferably 5-fold to 50-fold, which also depends on the respective numbers of fluorine atoms, with respect to the molar proportion of the hydrolyzable silane compound having a perfluoropolyether group. When the molar proportion of the hydrolyzable silane compound having a fluorine-containing group different from the perfluoropolyether group is less than that described above, an effect of preventing the aggregation of the perfluoropolyether group lowers, with the result that coating film surface unevenness, a development residue, and the like occur in some cases.

Meanwhile, most of the hydrolyzable silane compounds having a fluorine-containing group different from the perfluoropolyether group do not exhibit water-repellent, oil-repellent, and antifouling functions by themselves. Therefore, when the addition amount of the hydrolyzable silane compound having a fluorine-containing group different from the perfluoropolyether group is too large, the water-repellent, oil-repellent, and antifouling functions tend to lower.

In the present invention, each of the hydrolyzable silane compounds is not used alone, but the hydrolyzable silane compounds are condensed to be used as a condensed product. With this, compatibility between the cationically photopolymerizable resin layer 4 and the condensed product and film formation property at the time of the application become satisfactory, and satisfactory characteristics can be obtained also when patterning is performed by cationic photopolymerization.

This condensation reaction is performed by allowing a hydrolysis reaction and/or a condensation reaction to proceed under heating in the presence of water. A desired degree of condensation can be obtained by appropriately controlling the hydrolysis/condensation reaction by temperature, time, concentration, pH, and the like.

In this case, the degree of the progress of the condensation reaction (degree of condensation) can be defined by a ratio of the number of condensed functional groups with respect to the number of condensable functional groups. The condensable functional groups correspond to the above-mentioned hydrolyzable substituents. The degree of condensation can be estimated by $^{29}$Si-NMR measurement. For example, in the case of a silane compound having three hydrolyzable substituents in one molecule, the degree of condensation is calculated according to the following equation from the following proportions.

T0 form: Si atom not bonded to any other silane compound

T1 form: Si atom bonded to one silane compound via oxygen

T2 form: Si atom bonded to two silane compounds via oxygen

T3 form: Si atom bonded to three silane compounds via oxygen $$\text{Degree of condensation} = \frac{(T1 + 2*T2 + 3*T3)*100}{3*(T0 + T1 + T2 + T3)}$$

The degree of condensation, which also varies depending on the kinds of the hydrolyzable silane compounds to be used and synthesis conditions, is preferably 20% or more, more preferably 30% or more, still more preferably 40% or more from the viewpoints of compatibility with a resin and application property. Further, the degree of condensation is preferably 90% or less from the viewpoint of preventing precipitation, gelation, and the like. In this regard, however, it is rare that the degree of condensation is more than 90% in a state of dissolving in a solution. In addition, when the proportion of an unreacted silane is high, the homogeneity of the coating film lowers in some cases, and hence the proportion of the unreacted silane (T0 form) is preferably 20% or less. Further, when the proportion of a silane in which all hydrolyzable groups are condensed increases, water-repellent and antifouling properties lower and a gel precipitates in a solution in some cases. For example, in a silane converted to a T3 form in a solution, the degree of freedom of a substituent lowers, and the surface orientation of fluorine in a coating film to be obtained is disturbed in some cases, with the result that water-repellent and antifouling properties lower in some cases. Therefore, it is preferred that the amount of the T3 form be controlled to 50% or less.

It should be noted that, similarly in the case of a silane compound having two hydrolyzable substituents with respect to one silane atom, the degree of condensation can be calculated according to the following equation.

D0 form: Si atom not bonded to any other silane compound

D1 form: Si atom bonded to one silane compound via oxygen

D2 form: Si atom bonded to two silane compounds via oxygen $$\text{Degree of condensation} = \frac{(D1 + 2*D2)*100}{2*(D1 + D2)}$$

Similarly in the case of a silane compound having one or four hydrolyzable substituents with respect to one silane atom, the degree of condensation is calculated as a proportion of the number of condensed groups with respect to the hydrolyzable substituents (condensable groups).

Further, in the hydrolysis reaction and/or a condensation reaction, a metal alkoxide, an acid, an alkali, or the like may be utilized as a catalyst for hydrolysis to control the degree of condensation. Examples of the metal alkoxide include an aluminum alkoxide, a titanium alkoxide, a zirconia alkoxide, and complexes (e.g., an acetylacetone complex) thereof. One kind of those metal alkoxides may be used alone, or two or more kinds thereof may be used in combination. It is also useful to adjust the pH with an acid or an alkali. When an alkali catalyst is used, solid matter such as a gel precipitates in a solution in some cases. Hence, an acid catalyst is more preferred. In this regard, however, when an inorganic strong acid such as hydrochloric acid or sulfuric acid remains, the remaining acid affects the surrounding members such as a base material in some cases. Further, when the pH is too low, the epoxy group in the condensed product may undergo ring-opening to lower coating film characteristics. Therefore, an acid which is a weak acid such as a carboxylic acid and has a low molecular weight and volatility is preferred. Suitable specific examples thereof include low-molecular organic acids such as acetic acid, glycolic acid, and formic acid. It should be noted that those organic acids are added at the time of synthesis, but are often contained in trace amounts in silane compounds to serve as raw materials. Hence, even when no acid is added, the synthesis is performed without any problem in many cases.

In the present invention, multiple silane compounds are used in combination. Hence, caution needs to be exercised when hydrolysis reaction and/or a condensation reaction rates significantly vary depending on the kinds of the silane compounds. When a condensation reaction proceeds for only a silane compound having a high reaction rate, and a silane compound having a low reaction rate remains unreacted, the homogeneity and water repellency of a coating film lower in some cases. It is preferred to use a catalyst such as an acid in order to subject the respective silane compounds to a reaction as homogeneously as possible.

The condensed product is synthesized in a no-fluorine-containing organic solvent having a group or bond containing an oxygen atom such as a hydroxy group, a carbonyl group, or an ether bond. Specific examples thereof include no-fluorine-containing polar solvents such as: alcohols such as methanol, ethanol, propanol, isopropanol, and butanol; ketones such as methyl ethyl ketone and methyl isobutyl ketone; esters such as ethyl acetate and butyl acetate; ethers such as diglyme and tetrahydrofuran; and glycols such as diethylene glycol. Of those, alcohols having high solubility in water are most suitable. Further, heating is preferably performed at 100° C. or less from the viewpoint of controlling the content of water. Therefore, when a reaction is performed under heating and reflux, a polar solvent having a boiling point of 50° C. to 100° C. is suitable. One kind of those polar solvents may be used alone, or two or more kinds thereof may be used in combination. A polar solvent such as an alcohol is generally used for the hydrolysis/condensation reaction of a silane compound. Also in the present invention, water and a silane compound having a polar group such as an epoxy group are used for synthesis, and hence it is necessary to use a polar solvent. On the other hand, however, the hydrolyzable silane compound having a perfluoropolyether group tends to have low solubility in a polar solvent. The inventors of the present invention have found that a homogeneous condensed product can be synthesized by using a mixed solvent of a no-fluorine-containing polar solvent and a fluorine-containing solvent and controlling the length of a perfluoropolyether group to a proper length.

Further, when the number of repeating units in the above-mentioned perfluoropolyether group is large, the solubility in a no-fluorine-containing polar solvent lowers, and hence the condensed product is preferably obtained by heating a hydrolyzable silane compound having an epoxy group and a hydrolyzable silane compound having a perfluoropolyether group in a mixture of a no-fluorine-containing organic solvent and a fluorine-containing solvent. In the hydrolyzable silane compound having a perfluoropolyether group, as the number of fluorine atoms becomes larger, solubility in a polar solvent becomes lower. However, the content of water is low in the fluorine-containing solvent which is easy to dissolve the hydrolyzable silane compound having a perfluoropolyether group, and hence the reaction hardly proceeds. The inventors of the present invention have found that a homogeneous condensed product can be synthesized by using a mixed solvent of a no-fluorine-containing polar solvent and a fluorine-containing solvent even in the case of using a hydrolyzable silane compound having a perfluoropolyether group, which has low solubility.

In this case, examples of the fluorine-containing solvent to be used in combination with the no-fluorine-containing polar solvent include a hydrofluorocarbon, a perfluorocarbon, a hydrofluoroether, a hydrofluoropolyether, and a perfluoropolyether. Of those, a hydrofluoroether, a hydrofluoropolyether, a perfluoropolyether, or the like, which has an oxygen atom and has an affinity for water, is preferred because the addition of water is required for hydrolysis. One kind of those fluorine-containing solvents may be used alone, or two or more kinds thereof may be used in combination.

It should be noted that, in each of the no-fluorine-containing organic solvent and the fluorine-containing solvent, a solvent having a so-called hetero atom such as a nitrogen atom or a sulfur atom is not preferred because the solvent may affect a curing process for a coating film.

When the fluorine-containing solvent and the no-fluorine-containing organic solvent are used as a mixture, a combination thereof is not particularly limited but is preferably a combination of an alcohol and a hydrofluoroether.

The mixing proportion (volume ratio) between the no-fluorine-containing organic solvent and the fluorine-containing solvent is preferably 2:8 to 9:1, more preferably 3:7 to 8:2. It should be noted that the hydrolyzable silane compound having an epoxy group is poorly soluble in the fluorine-containing solvent (the fluorine-containing solvent alone), and the hydrolyzable silane compound having a perfluoropolyether group is poorly soluble in an alcohol. Further, the hydrolyzable silane compound having a perfluoropolyether group is often used by being dissolved in the fluorine-containing solvent from the viewpoint of storage stability, and the mixing with the fluorine-containing solvent can suppress an unnecessary condensation reaction.

The active component concentration of a reaction solution is preferably 5 mass % or more and 60 mass % or less, more preferably 10 mass % or more and 50 mass % or less. When the active component concentration is 5 mass % or more, a sufficient reaction rate is obtained. When the active component concentration is 60 mass % or less, the occurrence of gelation and precipitation can be suppressed. It should be noted that, when the hydrolyzable group of the hydrolyzable silane compound is an alkoxy group, an alcohol and water are generated through the hydrolysis reaction and/or a condensation reaction. Therefore, it is difficult to calculate an actual component concentration of a solution. In view of the foregoing, a value calculated on the assumption of a state of a degree of condensation of 100% in which all alkoxy groups are hydrolyzed and all silanol groups are condensed is herein defined as an active component concentration.

The addition amount of water to be used for the reaction is preferably 0.5 to 3 equivalents, more preferably 0.8 to 2 equivalents, with respect to the hydrolyzable substituents of the hydrolyzable silane compounds. When the addition amount of water is 0.5 equivalent or more, a sufficient reaction rate in the hydrolysis/condensation reaction is obtained. When the addition amount of water is 3 equivalents or less, the precipitation of the hydrolyzable silane compound having a perfluoropolyether group can be suppressed.

For the layer 5 including the condensed product, a desired coating film may be produced by applying a solution including the resultant condensed product on the cationically photopolymerizable resin layer 4 before curing through use of an application apparatus for general use such as a spin coater, a die coater, a slit coater, or a spray coater. Further, when the concentration of a material is adjusted, dip coating is also applicable.

When the resultant condensed product is applied as a solution, the concentration of the solution including the condensed product is appropriately determined depending on a material for the layer 5 including the condensed product, an application method, and an intended use. When using the spin coater, the die coater, the slit coater, or a spray coater and so on, the concentration of the condensed product in the solution including the condensed product is preferably 0.1 to 20 mass %, more preferably 1 to 10 mass %. When the concentration of the condensed product falls within this range, sufficient water repellency and durability are obtained, and homogeneous water repellency is obtained over the entire coating film surface.

The thickness of the layer 5 including the condensed product is preferably 50 to 10,000 nm, more preferably 80 to 5,000 nm. When the thickness is less than 50 nm, homogeneous water repellency is hardly obtained, and durability is insufficient in some cases. Further, when the thickness is too large, reductions in patterning characteristics such as deformation of a pattern and a reduction in resolution property occur in some cases. According to the configuration of the present invention, even a thin coating film can express high durability through use of cationic polymerization and heat-induced silane polycondensation in combination in the curing reaction of the coating film.

Next, cured regions of the cationically photopolymerizable resin layer 4 and the layer 5 including the condensed product are pattern-exposed to light 8 via a mask 6 (FIG. 2D). UV light may be used as the light 8. For example, exposure at a single wavelength with i-line (365 nm) may be employed. In irradiation regions, an acid generated from a cationic photopolymerization initiator present in the cationically photopolymerizable resin layer 4 diffuses into the layer 5 including the condensed product.

It is also suitable to add a photopolymerization initiator, a light absorber, a sensitizer, an epoxy resin, or the like to the layer 5 including the condensed product for the purpose of improving the patterning characteristics of the layer 5 including the condensed product.

Next, heating treatment is performed in order to subject the exposed portions of the cationically photopolymerizable resin layer 4 and the layer 5 including the condensed product to simultaneous curing (FIG. 2E). When the heating treatment is performed, a reaction proceeds in the exposed portions, and resistance in the subsequent developing step can be imparted. At this time, an ether bond is formed between the cationically photopolymerizable resin layer 4 and the layer 5 including the condensed product through the reaction of the epoxy group. Further, it is considered that a dehydration condensation reaction between a silanol group and a hydroxy group also proceeds between the cationically photopolymerizable resin layer 4 and the layer 5 including the condensed product. As a result, a stronger bond is formed between the cationically photopolymerizable resin layer 4 and the layer 5 including the condensed product, and thus adhesiveness is ensured. Further, the cationically photopolymerizable resin layer 4 and the layer 5 including the condensed product dissolve into each other at their interface. When a layer in which the resin layer 4 and the layer 5 including the condensed product are mutually mixed is present, an even stronger bond is formed, and thus durability drastically improves.

Figure 2F:
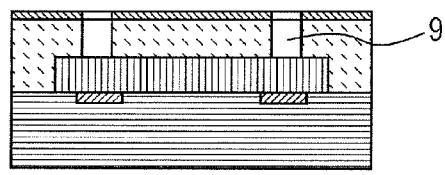

Next, the cationically photopolymerizable resin layer 4 and the layer 5 including the condensed product are developed to remove non-exposed portions. Thus, the ejection orifices 9 are formed (FIG. 2F). Further, with this, the member 4 and the water-repellent layer 5 are formed. A developing solution to be used for the development is not particularly limited as long as the solution is one capable of developing the non-exposed portions of the cationically photopolymerizable resin layer 4 and the layer 5 including the condensed product. For example, a mixture of methyl isobutyl ketone (MIBK) and xylene may be used as the developing solution. Rinsing treatment with isopropanol or the like may be performed after the development treatment has been performed.

Figure 2G:
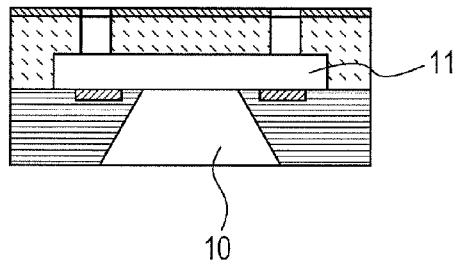

Next, an ink supply port 10 is formed in the back surface of the substrate 1. In addition, an ink flow path 11 is formed by removing the ink flow path pattern 3 (FIG. 2G). A method of forming the ink supply port 10 is not particularly limited. For example, the ink supply port 10 may be formed by anisotropic etching with an alkali solution or by laser irradiation. As a method of removing the ink flow path pattern 3, for example, there is given a method of removing the ink flow path pattern 3 involving immersing the substrate 1 in a solvent capable of dissolving the ink flow path pattern 3. Further, as necessary, the ink flow path pattern 3 may be exposed to an active energy ray capable of degrading the ink flow path pattern 3 in order to enhance its solubility.

After that, electrical joining is established in order to drive the energy generating elements 2 are. In addition, an ink supply member for supplying ink and the like are connected. Thus, an ink jet recording head can be completed.

EXAMPLES

Examples and Comparative Examples are shown below. However, the present invention is not limited thereto. Various measurements and evaluations were performed by methods shown below.

(Degree of Condensation)

The degree of condensation of a prepared condensed product was calculated based on the above-mentioned definition by performing $^{29}$Si-NMR measurement through use of a nuclear magnetic resonance apparatus (product name: AVANCE II 500 MHz, manufactured by Bruker BioSpin Co.).

(External Appearance)

The external appearances of a solution including a prepared condensed product and a coating film of the solution were evaluated by an optical microscope.

(Pure Water Contact Angle)

As an evaluation of a produced ink jet recording head, a dynamic receding contact angle θr with pure water was measured through use of a micro contact angle meter (product name: Drop Measure, manufactured by MICROJET Corporation), and initial water repellency was evaluated. Further, as an evaluation of the durability of a nozzle surface, the nozzle surface was immersed in ink, kept at 60° C. for 1 week, and then washed with water, and a dynamic receding contact angle θr with pure water in the vicinity of ejection orifices was measured. In addition, as an evaluation of the durability against abrasion, a wiping operation using a blade made of hydrogenated nitrile rubber (HNBR) was carried out 2,000 times while pigment ink was sprayed onto the nozzle surface, and then a dynamic receding contact angle θr with pure water was measured. With this, durability against wiping was examined.

Example 1

A substrate 1 made of silicon on which energy generating elements 2 were formed was prepared. A solution obtained by dissolving polymethyl isopropenyl ketone as a positive photosensitive resin material in ethyl acetoacetate was applied onto the substrate 1 by a spin coating method. After that, the resultant was baked to form a positive photosensitive resin layer. The positive photosensitive resin layer had a thickness of 14 μm.

Next, the positive photosensitive resin layer was pattern-exposed by irradiation with UV light capable of photosensitizing the layer via a mask. After that, the exposed portion was dissolved and developed through use of a mixed solvent of propylene glycol methyl ether acetate and methyl isobutyl ketone to form an ink flow path pattern 3.

100 parts by mass of a cationically photopolymerizable resin material (trade name: EHPE-3150, manufactured by Daicel Corporation) and 6 parts by mass of a cationic photopolymerization initiator (trade name: SP-172, manufactured by ADEKA CORPORATION) were dissolved in 80 parts by mass of xylene as a solvent. The solution was applied onto the ink flow path pattern 3 and the substrate 1 by a spin coating method to form a cationically photopolymerizable resin layer 4.

A condensed product obtained by condensation of a hydrolyzable silane compound having an epoxy group and a hydrolyzable silane compound having a perfluoropolyether group was prepared by a method shown below. 12.53 g (0.045 mol) of γ-glycidoxypropyltriethoxysilane, 8.02 g (0.045 mol) of methyltriethoxysilane, 1.05 g (0.00091 mol) of a compound represented by the formula (10), 5.95 g of water, 13.4 g of ethanol, and 4.20 g of hydrofluoroether (trade name: HFE 7200, manufactured by Sumitomo 3M Limited) were stirred at room temperature for 5 minutes in a flask equipped with a cooling pipe. After that, the mixture was heated to reflux for 24 hours to prepare a condensed product.

The resultant condensed product was diluted through use of 2-butanol/ethanol so as to have a concentration of active ingredient of 7 mass %. The diluted solution was applied onto the cationically photopolymerizable resin layer 4 before curing through use of a slit coater to form the layer 5 including the condensed product.

Next, the cationically photopolymerizable resin layer 4 and the layer 5 including the condensed product were irradiated with i-line via the mask 6, followed by heating treatment at 90° C. for 4 minutes, so irradiated area was cured. Development treatment with a mixture of MIBK and xylene was performed and then rinsing treatment with isopropanol was performed to form an ejection orifices 9.

Next, anisotropic etching with an alkali solution was performed from the back surface of the substrate 1 to form an ink supply port 10. After that, the substrate 1 was irradiated with UV light for degrading the ink flow path pattern 3 and then immersed in methyl lactate to dissolve and remove the ink flow path pattern 3, to thereby form an ink flow path 11.

After that, electrical joining was established in order to drive the energy generating elements 2. In addition, an ink supply member for supplying ink was connected. Thus, an ink jet recording head was completed. The resultant ink jet recording head was evaluated by the above-mentioned methods. Table 1 shows the results.

Examples 2 to 24

An ink jet recording head was produced and evaluated in the same manner as in Example 1 except that kinds and blending ratios of silane compounds and solvent proportions shown in Table 1 were used. Table 1 shows the results.

Comparative Examples 1 and 2

An ink jet recording head was produced and evaluated in the same manner as in Example 1 except that kinds and blending ratios of hydrolyzable silane compounds, catalyst proportions and solvent proportions shown in Table 1 were used. Table 1 shows the results.

Comparative Example 3

An ink jet recording head was produced and evaluated in the same manner as in Example 1 except that the hydrolyzable silane compound having an epoxy group and the hydrolyzable silane compound having a perfluoropolyether group were not condensed but were simply mixed. Table 1 shows the results.

TABLE 1

| | Kind of silane | | | | Blending ratio (mol %) | Solvent proportion (%) | | | | | Degree of | External appearance | | Pure water contact angle | | |
| | A | B | C | D | A/B/C/D | Ethanol | HFE7200 | Catalyst | Water content ROR | condensation % | Solution | Coating film | Initial | After immersion | After abrasion |
|---|---|---|---|---|---|---|---|---|---|---|---|---|---|---|---|
| Example 1 | (i) | GPTES | MTEOS | — | 1/49.5/49.5/0 | 77 | 23 | Pure water | 1.2 | 56 | Transparant and homogeneous | OK | 98 | 92 | 94 |
| Example 2 | (i) | GPTES | MTEOS | — | 2/49/49/0 | 64 | 36 | Pure water | 1.2 | 55 | Transparant and homogeneous | OK | 97 | 94 | 94 |
| Example 3 | (i) | GPTES | HETES | — | 1/49.5/49.5/0 | 54 | 46 | Pure water | 1.2 | 59 | Transparant and homogeneous | OK | 92 | 87 | 89 |
| Example 4 | (i) | GPTES | MTEOS | TMES | 2/44/44/10 | 50 | 50 | Pure water | 1.2 | 56 | Transparant and homogeneous | OK | 97 | 90 | 92 |
| Example 5 | (i) | GPTMS | MTEOS | PhTES | 2/40/30/28 | 54 | 46 | Pure water | 1.2 | 51 | Transparant and homogeneous | OK | 95 | 90 | 91 |
| Example 6 | (i) | GPTES | — | — | 2/98/0/0 | 64 | 36 | Pure water | 1.2 | 51 | Transparant and homogeneous | OK | 91 | 85 | 88 |
| Example 7 | (i) | GPMDMS | MTEOS | — | 2/49/49/0 | 24 | 84 | Pure water | 1.2 | 54 | Transparant and homogeneous | OK | 92 | 88 | 88 |
| Example 8 | (i) | GPTES | DMDES | — | 1/49.5/49.5/0 | 35 | 65 | Pure water | 1.2 | 55 | Transparant and homogeneous | OK | 94 | 86 | 90 |
| Example 9 | (i) | GPTES | MTEOS | — | 1/49.5/49.5/0 | 77 | 23 | Pure water | 2 | 75 | Slightly opaque | OK | 94 | 90 | 89 |
| Example 10 | (i) | GPTES | MTEOS | — | 1/49.5/49.5/0 | 77 | 23 | Pure water | 0.6 | 28 | Transparant and homogeneous | OK | 96 | 91 | 92 |
| Example 11 | (i) | GPTES | MTEOS | — | 5/47.5/47.5/0 | 49 | 51 | Pure water | 1 | 45 | Slightly opaque | OK | 96 | 91 | 92 |
| Example 12 | (i) | GPTES | MTEOS | — | 0.4/49.8/49.8/0 | 91 | 9 | Pure water | 1.2 | 52 | Transparant and homogeneous | OK | 94 | 86 | 90 |
| Example 13 | (ii) | GPTES | MTEOS | — | 1/49.5/49.5/0 | 15 | 85 | Pure water | 1.2 | 48 | Transparant and homogeneous | OK | 95 | 89 | 92 |
| Example 14 | (iii) | GPTES | MTEOS | — | 0.4/49.8/49.8/0 | 50 | 50 | Pure water | 1.2 | 52 | Slightly opaque | OK | 96 | 91 | 90 |
| Example 15 | (iii) | GPTES | MTEOS | — | 0.4/49.8/49.8/0 | 0 | 100 | Pure water | 1.2 | 48 | Opaque | Streak-like unevenness | 92 | 80 | 88 |
| Example 16 | (iii) | GPTES | MTEOS | — | 0.4/49.8/49.8/0 | 100 | 0 | Pure water | 1.2 | 55 | Opaque | Streak-like unevenness | 95 | 82 | 90 |
| Example 17 | (iv) | GPTES | MTEOS | — | 0.4/49.8/49.8/0 | 77 | 23 | Pure water | 1 | 50 | Slightly opaque | OK | 93 | 85 | 87 |
| Example 18 | (v) | GPTES | MTEOS | — | 0.4/49.8/49.8/0 | 77 | 23 | Pure water | 1 | 47 | Slightly opaque | OK | 88 | 80 | 85 |

TABLE 1-continued

| | Kind of silane | | | | Blending ratio (mol %) | Solvent proportion (%) | | Catalyst | Water content ROR | Degree of condensation % | External appearance Solution | Coating film | Pure water contact angle | | |
| --- | --- | --- | --- | --- | --- | --- | --- | --- | --- | --- | --- | --- | --- | --- | --- |
| | A | B | C | D | A/B/C/D | Ethanol | HFE7200 | | | | | | Initial | After immersion | After abrasion |
| Example 19 | GPTES (i) | | MTEOS | TFPTMS | 1/49.5/24.75/24.75 | 80 | 20 | Pure water | 1.2 | 70 | Transparant and homogeneous | OK | 98 | 90 | 91 |
| Example 20 | GPTES (i) | | MTEOS | TFPTMS | 1/49.5/24.75/24.75 | 80 | 20 | 1% Acetic acid aq. | 1.2 | 62 | Transparant and homogeneous | OK | 99 | 92 | 94 |
| Example 21 | GPTES (i) | | MTEOS | TFPTMS | 1/49.5/24.75/24.75 | 80 | 20 | 0.4% Formic acid aq. | 1.2 | 58 | Transparant and homogeneous | OK | 100 | 94 | 94 |
| Example 22 | GPTES (i) | | MTEOS | PFPTES | 1/44/44/11 | 80 | 20 | Pure water | 1.2 | 60 | Transparant and homogeneous | OK | 98 | 90 | 92 |
| Example 23 | GPTES (i) | | MTEOS | C4FTMS | 1/44/44/11 | 80 | 20 | Pure water | 1.2 | 56 | Transparant and homogeneous | OK | 94 | 84 | 88 |
| Example 24 | GPTES (i) | | MTEOS | C6FTES | 1/44/44/11 | 80 | 20 | Pure water | 1.2 | 56 | Transparant and homogeneous | OK | 95 | 86 | 89 |
| Comparative Example 1 | | | MTEOS | | 2/0/98/0 | 64 | 36 | Pure water | 1.2 | 58 | Transparant and homogeneous | OK | 82 | 50 | 65 |
| Comparative Example 2 | GPTES (vi) | | MTEOS | | 6/47/47/0 | 100 | 0 | Pure water | 1.5 | 68 | Transparant and homogeneous | OK | 82 | 55 | 62 |
| Comparative Example 3 | GPTES (i) | | MTEOS | | 1/49.5/49.5/0 | 77 | 23 | Pure water | 1.2 | 0 | Transparant and homogeneous | Streak-like unevenness | 80 | 50 | 60 |

Abbreviations in Table 1 are as described below.
(i): Compound represented by the formula (10)
(ii): Compound represented by the formula (11)
(iii): Compound represented by the formula (7)
(iv): Compound represented by the formula (8)
(v): Compound represented by the formula (9)
(vi): Tridecafluoro-1,1,2,2-tetrahydrooctyltriethoxysilane
GPTES: γ-Glycidoxypropyltriethoxysilane
GPMDMS: γ-Glycidoxypropylmethyltrimethoxysilane
MTEOS: Methyltriethoxysilane
DMDES: Dimethyldiethoxysilane
PhTES: Phenyltriethoxysilane
HETES: n-Hexyltriethoxysilane
TMES: Trimethylethoxysilane
TFPTMS: 3,3,3-Trifluoropropyltrimethoxysilane
PFPTES: Pentafluorophenyltriethoxysilane
C4FTMS: Nonafluorohexyltrimethoxysilane
C6FTES: (Tridecafluoro-1,1,2,2-tetrahydrooctyl)triethoxysilane Table 1 revealed that the ink jet recording head produced in the examples had satisfactory surface smoothness, had large initial θr, and thus exhibited satisfactory water repellency. Further, it was found that high water repellency was exhibited even after the durability test. The above-mentioned results showed that, under each of the conditions of Examples 1 to 24, the adhesion force between the water-repellent layer 5 and the member 4 was improved and the durability against wiping was improved. In addition, when printing was evaluated through use of the ink jet recording head, dot misalignment or the like was not observed, and high printing quality was exhibited.

On the other hand, the water repellency and durability were low in each of Comparative Examples 1, 2, and 3.

According to the present invention, the ink jet recording head having high water repellency and high durability against abrasion can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An ink jet recording head, comprising:
a member provided with an ejection orifice for ejecting ink; and a layer comprising a cured product of a condensed product obtained by condensation of a hydrolyzable silane compound having an epoxy group and a hydrolyzable silane compound having a perfluoropolyether group on a side of the member on which the ejection orifice opens,
wherein the member is a cured product of a cationically photopolymerizable material containing an epoxy resin having an epoxy group, and
wherein a bond is formed between the layer and the member
wherein the hydrolyzable silane compound having the a-perfluoropolyether group comprises at least one compound selected from the group consisting of compounds represented by the following formulae (2), (3), (4), and (5):

(2)

(3)

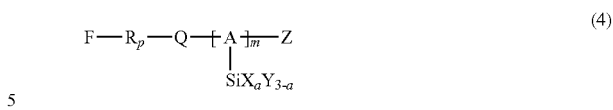

(4)

(5)

wherein, in the formulae (2), (3), (4), and (5), Rp represents a
perfluoropolyether group, 'A' represents an organic group having 1 to 12 carbon atoms, X represents a hydrolyzable substituent, Y represents a non-hydrolyzable substituent, Z represents a hydrogen atom or an alkyl group, R represents a non-hydrolyzable substituent, Q represents a divalent bonding group to set n=1 or Q represents a trivalent bonding group to set n=2, 'a' represents an integer of 1 to 3, and m represents an integer of 1 to 4.

2. The ink jet recording head according to claim 1, wherein the hydrolyzable silane compound having the epoxy group is represented by formula (1):

(1), wherein, in the formula (1), $R_C$ represents a non-hydrolyzable substituent having an epoxy group, R represents a non-hydrolyzable substituent, X represents a hydrolyzable substituent, and b represents an integer of 0 to 2.

3. The ink jet recording head according to claim 1, wherein the perfluoropolyether group $R_p$ in the formulae (2), (3), (4) and (5) is represented by the following formula (6):

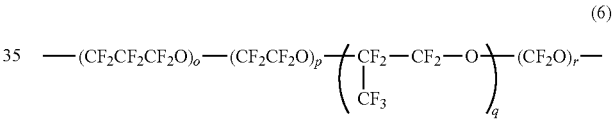

(6)

wherein, in the formula (6), o, p, q, and r each represent an integer of 0 or 1 or more, and at least one of o, p, q, and r represents an integer of 1 or more.

4. The ink jet recording head according to claim 1, wherein one of a number of repeating units in the perfluoropolyether group $R_p$ in the formulae (2), (3), (4), and (5) and o, p, q, or r in the formula (6) is an integer of 1 to 30.

5. The ink jet recording head according to claim 1, wherein the condensed product comprises a condensed product obtained by condensation of the hydrolyzable silane compound having the epoxy group, the hydrolyzable silane compound having the perfluoropolyether group, and a hydrolyzable silane compound represented by formula (12):

(12)

wherein, in the formula (12), $R_d$ represents an alkyl group or an aromatic group, X represents a hydrolyzable substituent, and a represents an integer of 1 to 3.

6. The ink jet recording head according to claim 1, wherein the condensed product comprises a condensed product obtained by condensation of the hydrolyzable silane compound having the epoxy group, the hydrolyzable silane compound having the perfluoropolyether group, and a hydrolyzable silane compound having a fluorine-containing group different from the perfluoropolyether group.

7. The ink jet recording head according to claim 6, wherein the hydrolyzable silane compound having the fluorine-containing group different from the perfluoropolyether group comprises a hydrolyzable silane compound represented by formula (13):

   (13), wherein, in the formula (13), $R_f$ represents an alkyl group or aryl group having a fluorine atom, X represents a hydrolyzable substituent, R represents a non-hydrolyzable substituent, 'a' represents an integer of 1 or 2, b represents an integer of 0 to 2, and a+b represents an integer of 1 to 3.

8. The ink jet recording head according to claim 1, wherein the bond is a bond between the epoxy group of the hydrolyzable silane compound included in the layer and the epoxy group of the epoxy resin included in the member.

9. The ink jet recording head according to claim 1, wherein the layer is a water-repellent layer.

* * * * *